Figure 1:
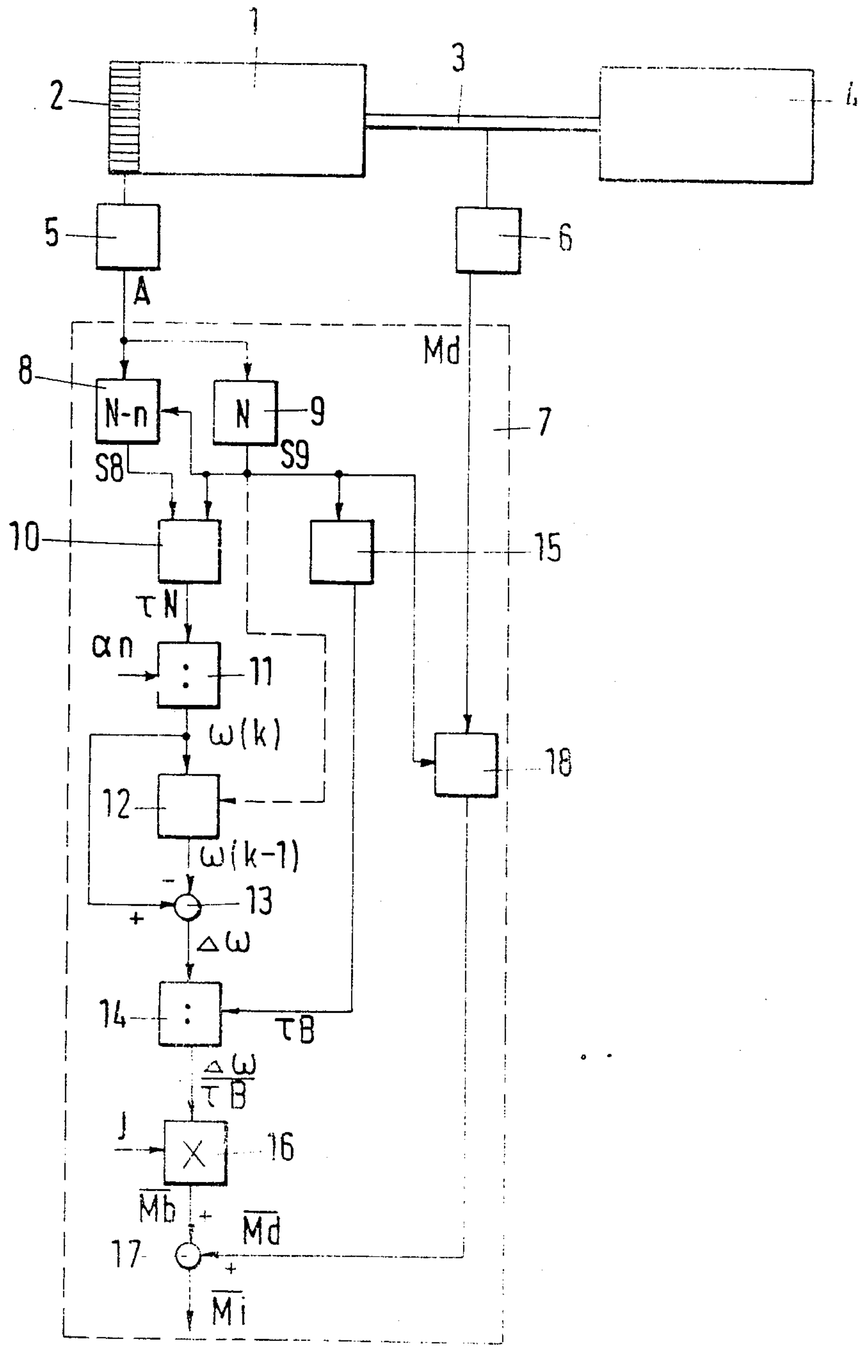

United States Patent [19]

Weyland

[11] Patent Number: 4,898,025

[45] Date of Patent: Feb. 6, 1990

[54] METHOD FOR DETERMINING THE MEAN EFFECTIVE TORQUE OF AN INTERNAL COMBUSTION ENGINE

[75] Inventor: Matthias Weyland, Kallstadt, Fed. Rep. of Germany

[73] Assignee: Asea Brown Boveri Aktiengesellschaft, Mannheim, Fed. Rep. of Germany

[21] Appl. No.: 285,703

[22] Filed: Dec. 16, 1988

[30] Foreign Application Priority Data

Dec. 18, 1987 [DE] Fed. Rep. of Germany ....... 3743066

[51] Int. Cl.[4] .............................................. G01M 15/00

[52] U.S. Cl. .................................................... 73/117.3

[58] Field of Search .................... 73/117.3, 116, 862.27

[56] References Cited

U.S. PATENT DOCUMENTS 4,581,923 4/1986 Nitao et al. ........................... 73/116

4,843,870 7/1989 Citron et al. .......................... 73/116

*Primary Examiner*—Jerry W. Myracle

*Attorney, Agent, or Firm*—Herbert L. Lerner; Laurence A. Greenberg

[57] ABSTRACT

The method determines the means effective torque of an internal combustion engine connected to a load device. The crankshaft angular velocity is scanned at equidistant angular crankshaft positions spaced apart in time by a whole number multiple of the torque harmonic period. Differentiation of the crankshaft angular velocity with respect to time also takes place by forming the difference between sequential angular velocities and by time measurement of the scanning period. The mean acceleration torque is formed by multiplying the determined crankshaft acceleration by the moment of inertia of the internal combustion engine and is added to the shaft torque recorded by use of a torque sensor to form the mean effective torque. The torque thus determined is not subject to the typical torque harmonics of the internal combustion engine.

8 Claims, 2 Drawing Sheets

METHOD FOR DETERMINING THE MEAN EFFECTIVE TORQUE OF AN INTERNAL COMBUSTION ENGINE

The invention relates a method for determining the mean effective torque of an internal combustion engine connected by a connecting shaft to a load device, wherein the shaft torque is determined by means of a torque sensor.

In this context, the effective torque means the sum of all of the torques which are applied by the internal combustion engine to the masses which are moved. The method can be applied to all internal combustion engines with cyclic combustion.

A method for determining the torque of an internal combustion engine is known from a book by Grohe, entitled "Messen an Verbrennungsmotoren" [Measurements on internal combustion engines], 1977, Vogel-Verlag, "Werzburg, Germany, pages 20 to 30. In this method, it is proposed to measure the torque by means of a "power brake" or by means of a "dynamometric shaft". The "power brake" can therefore have an electric machine (direct current electric dynamometer) as a load device.

Since an internal combustion engine produces a torque transient per combustion stroke and cylinder (working stroke), typical torque harmonics occur. The torque oscillations are periodic in angle. In order to determine the mean effective torque accurately, it is necessary to process the measured torque signal by using filters to suppress the harmonics.

It is accordingly an object of the invention to provide a method for determining the mean effective torque of an internal combustion engine, which overcomes the hereinafore-mentioned disadvantages of the heretofore-known methods of this general type and which supplies a torque signal which does not include torque harmonics.

With the foregoing and other objects in view there is provided, in accordance with the invention, a method for determining the mean effective torque of an internal combustion engine connected through a connecting shaft to a load device, which comprises determining the torque of the shaft with a torque sensor connected to the shaft, scanning the angular velocity of the crankshaft of the engine at equidistant angular points on the crankshaft being spaced apart in time by a whole number multiple of the torque harmonic period, differentiating the crankshaft angular velocity with respect to time by forming the difference between sequential angular velocities and time measurement of a scanning period, forming a mean acceleration torque from the crankshaft angular acceleration determined by multiplication with the mass moment of inertia of the internal combustion engine, and adding the acceleration torque to the mean shaft torque to provide the mean effective torque.

The particular advantages provided by the invention are due to the fact that the mean value of the torque during the corresponding interval can be determined synchronously with the crankshaft, immediately after the interval has elapsed, by taking account of the type of internal combustion engine and the resulting angular interval in which each torque harmonic occurs. The torque is averaged over an angle interval dependent on the process instead of over the usual fixed time interval. Filtering takes place automatically by a suitable selection of the interval limits. Through digital differentiation of the angular velocity of the crankshaft with respect to time (scanning of the periodic process at intervals of a whole number multiple of the process period) in synchronism with the crankshaft, the harmonics typical of the process are filtered out. No additional dynamic element (such as a low pass filter or the like) with its own vibration behavior, is necessary. The averaging takes place by means of the mass moment of inertia of the internal combustion engine, acting as a "mechanical integrator".

In accordance with another mode of the invention, there is provided a method which comprises integrating the determined shaft torque over the scanning period in addition to the acceleration torque.

In accordance with a further mode of the invention, there is provided a method which comprises scanning the crankshaft angular velocity with an inductive toothed ring sensor emitting one electrical pulse per tooth of a toothed starter ring of the engine.

In accordance with an added mode of the invention, there is provided a method which comprises recording an angular position of the crankshaft with an optical sensor.

In accordance with an additional mode of the invention, there is provided a method which comprises recording an angular position of the crankshaft with a capacitive sensor.

In accordance with yet another mode of the invention, there is provided a method which comprises recording an angular position of the crankshaft with a mechanical sensor.

In accordance with a concomitant mode of the invention, there is provided a method which comprises starting each calculation of the acceleration torque after a given number of pulses of the toothed ring sensor, and setting the given number of pulses as a whole number multiple of the number of teeth of a toothed starter ring of the engine multiplied by the number of strokes per working cycle and divided by twice the number of cylinders, for a reciprocating piston in-line engine.

Other features which are considered as characteristic for the invention are set forth in the appended claims.

Although the invention is illustrated and described herein as embodied in a method for determining the mean effective torque of an internal combustion engine it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 2:
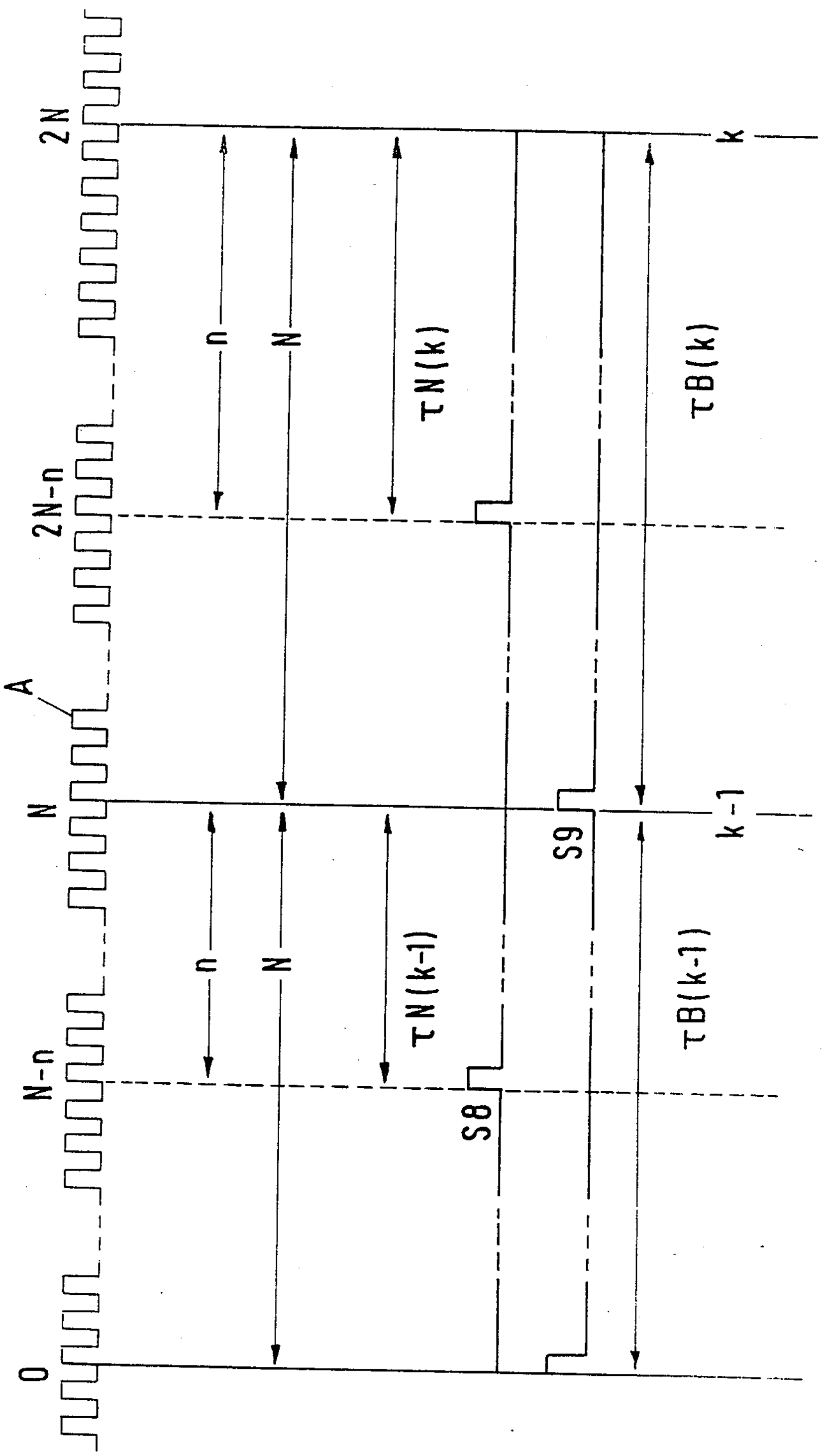

FIG. 1 is a schematic and block circuit diagram of a configuration for determining the mean effective torque of a reciprocating piston internal combustion engine: and FIG. 2 is a pulse diagram for time measurement.

Referring now to the figures of the drawing in detail and first, particularly, to FIG. 1 thereof, there is seen a diagrammatic configuration for determining the mean effective torque of a reciprocating piston internal combustion engine. The reciprocating piston internal combustion engine is provided as an example of an internal combustion engine with cyclic combustion. The method can also be applied to other internal combustion engines with cyclic combustion, such as Wankel engines. The reciprocating piston internal combustion engine can, for example, be constructed as an in-line or straight engine, an opposed cylinder or flat engine, or a V-engine, etc.

FIG. 1 shows a reciprocating piston internal combustion engine 1 with a toothed starter ring 2. A load device 4, such as an electrical machine (direct current machine), is connected to the internal combustion engine 1 by means of a connecting shaft 3. An inductive toothed ring sensor 5 disposed at the inductive ring 2 has an output which emits one electrical pulse A per tooth of the toothed starter ring. The connecting shaft 3 is provided with a torque sensor 6 for recording the shaft torque Md.

A microcomputer 7 is provided for determining the effective torque of the internal combustion engine 1 from the shaft torque Md and the pulses A of the toothed ring sensor 5. The microcomputer 7 contains two digital counters 8 and 9 having inputs receiving the pulses A from the toothed ring sensor 5. After N−n pulses, the digital counter 8 sends an output pulse S8 to a first time-measurement device 10 and after N pulses, the digital counter 9 sends an output pulse S9 to the same first time-measuring device 10. The number of teeth n in a rotational speed scanning window is an arbitraty and preferably small number of teeth (e.g. n−1, 2, 3 . . . ). Each pulse S9 resets the counter 8 to 0.

The first time-measurement circuit 10 records the time interval $\tau N$ (rotational speed scanning window time) elapsing between the output pulses of the digital counters 8 and 9 and feeds it as a divisor to a divider 11. The angle $\alpha n$ of the starter tooth ring or the crankshaft (crankshaft angle) corresponding to the number of teeth n is provided to the divider 11 as the dividend. The quotient $\omega(k)=\alpha n/\tau(k)$ available from the divider 11 responds to the crankshaft angular velocity $\omega(k)$ at a scanning time k and is fed to a triggerable memory 12 and a subtractor 13 with a positive sign (for simplicity, the scanning times . . . t(k−1), t(k), t(k+1) are indicated as . . . k−1, k, k+1 . . . ). The memory 12 feeds the angular velocity $\omega(k-1)$ occurring at the previous scanning time k−1 to the subtractor 13. The subtractor 13 forms a change in angular velocity $\Delta\omega=\omega(k)-\omega(k-1)$ and feeds this as a dividend to a divider 14. A scanning period time $\tau B$ is available as a divisor at the divider 14. The scanning period time $\tau B$ (for example the time interval between N and 2N) is recorded by means of a second time-measuring circuit 15, which has an input receiving the output pulses of the digital counter 9. The pulses S9 of the counter trigger the memory 12, i.e. the memory 12 accepts the currently present angular velocity $\omega$ after each expiration of $\tau B$.

The quotient $\Delta\omega/\tau B$ (crankshaft angular acceleration) formed by the divider 14, is fed to a multiplier 16. The mass moment of inertia J of the internal combustion engine 1 is also available at the input of the multiplier 16. The product $\Delta\omega\cdot J/\tau B$ of the multiplier 16 corresponds to the average acceleration torque Mb during the preceding scanning period 0196 $\tau B$ in accordance with $$\overline{Mb}=\frac{1}{t(k)-t(k-1)}\int_{t(k-1)}^{t(k)} Mb\,dt$$

-continued ($t$ = time).

Since $\tau B(k)=t(k)-t(k-1)$, the following equation also applies $$\overline{Mb}=\frac{1}{\tau B(k)}\int_{t(k-1)}^{t(k)} Mb\,dt$$

In order to obtain the mean effective torque $\overline{Mi}$ during the preceding scanning period $\tau B$, it is necessary to add the mean shaft torque $\overline{Md}$ during the same scanning period, according to the relationship $$\overline{Md}=\frac{1}{t(k)-t(k-1)}\int_{t(k-1)}^{t(k)} Md\,dt$$

to the mean shaft acceleration torque $\overline{Mb}$. The mean shaft torque $\overline{Md}$ is determined from Md by means of an integrator 18. The integration limits t(k) and t(k−1) are specified to the integrator 18 by the output pulses of the counter 9. An adder 17 is provided to form the mean effective torque $\overline{Mi}=\overline{Md}+\overline{Mb}$.

FIG. 2 shows a pulse diagram for time measurement. The pulses A of the inductive toothed ring sensor 5 and the pulses S8 and S9 of the counters 8 and 9 are shown N indicates the number of teeth and therefore simultaneously indicates the number of pulses A per calculation interval (scanning period tooth number). It is assumed in this case that an internal combustion engine with cyclic combustion represents a natural scanning system which produces a torque fluctuation per combustion stroke and cylinder which causes the typical torque harmonics. In the case of rotational speed scanning at discrete crankshaft angular positions, these harmonics are not recorded, i.e. the harmonics typical of the process are completely filtered out by scanning the periodic process at intervals of a whole number multiple of the process period. The number X of teeth per torque harmonic period in the case of a reciprocating piston in-line engine is determined by means of the relationship $$X=(Z\cdot M)/(2\cdot C)$$

where Z is the number of teeth on the toothed starter ring, M is the number of strokes per working cycle and C is the number of cylinders of the internal combustion engine Scanning and calculation take place after a whole number multiple N=z·X, where z is an arbitrary whole number (for example z=1, 2, 3). The calculation of the acceleration torque $\overline{Mb}$ is consequently started after every N pulses of the toothed ring sensor 5, wherein the number N (in the case of a reciprocating piston in-line engine) is a whole number (z) multiple of the number of teeth Z of the toothed starter ring 2 multiplied by the number of strokes M per working cycle, and divided by twice the number of cylinders C. The scanning therefore takes place at equidistant angular points which are spaced apart in time by a distance that is a whole number multiple of the torque harmonic period.

Due to the connection of the two digital counters 8, 9 shown in FIG. 1, it is possible to generate pulses for the scanning times N, 2N . . . which are equidistant in angle, and also pulses N−n, 2N−n . . . which are each located before the scanning pulses N, 2N . . . by a number of tooth pulses n which is much less than N, without having to make use of a dead center mark sensor.

The first time-measurement circuit 10 determines the time interval $\tau N(k)$ between the pulses N and N−n . . . , required by the crankshaft to traverse an angle $\alpha n$ corresponding to the counter number n. Through the use of the quotient $\alpha n/\tau N$, the divider 11 provides the average crankshaft angular velocity $\omega(k)$ during the last n teeth before each scanning time k. As n is made smaller, this average of the angular velocity becomes a more accurate approximation of the instantaneous value at the scanning time. The angular velocity $\omega(k-1)$ from the previous cycle is still stored in the memory 12. The difference $\Delta\omega=\omega(k)-\omega(k-1)$ formed by means of the subtractor 13 indicates the amount by which the angular velocity $\omega$ has changed The time in which this change has taken place, i.e. the scanning period time $\tau(k-1)$, $\tau(k)$ . . . in each case is formed by the second time-measurement circuit 15. Dividing the angular velocity difference $\Delta\omega$ by the scanning period time $\tau B$ gives a value directly proportional to the accelerating torque which still has to be multiplied by the mass moment of inertia J of the internal combustion engine and added to the mean shaft torque $\overline{Md}$, as may be seen from FIG. 1, in order to calculate the mean effective torque $\overline{Mi}$ during the scanning period The time period $\tau N$ and the scanning period time $\tau B$ are available without delay at the scanning time k for calculating the mean effective torque $\overline{Mi}$ during the preceding scanning period time $\tau B$.

Instead of the inductive toothed ring sensor mentioned above, it is also possible to employ optical (e.g. photocell), capacitive, mechanical or other sensors. It is then only necessary to ensure that an angular position can be recorded by the sensor. An interrupter represents an appropriate mechanical sensor. If an optical, capacitive or mechanical sensor is used, the counters 8 and 9 can possibly be omitted and the "starting point" and the "end point" of the pulses defining the angular position can be fed directly to the time measurement circuits 10 and 15.

The foregoing is a description corresponding in substance to German Application P 37 43 066.1, dated Dec. 18, 1987 the International priority of which is being claimed for the instant application, and which is hereby made part of this application. Any material discrepancies between the foregoing specification and the aforementioned corresponding German application are to be resolved in favor of the latter.

I claim:

1. Method for determining the mean effective torque of an internal combustion engine connected through a connecting shaft to a load device, which comprises determining the torque of the shaft with a torque sensor connected to the shaft, scanning the angular velocity of the crankshaft of the engine at equidistant angular points on the crankshaft being spaced apart in time by a whole number multiple of the torque harmonic period, differentiating the crankshaft angular velocity with respect to time by forming the difference between sequential angular velocities and time measurement of a scanning period, forming a mean acceleration torque from the crankshaft angular acceleration determined by multiplication with the mass moment of inertia of the internal combustion engine, and adding the acceleration torque to the mean shaft torque to provide the mean effective torque.

2. Method according to claim 1, which comprises integrating the determined shaft torque over the scanning period in addition to the acceleration torque.

3. Method according to claim 1, which comprises scanning the crankshaft angular velocity with an inductive toothed ring sensor emitting one electrical pulse per tooth of a toothed starter ring of the engine.

4. Method according to claim 3, which comprises starting each calculation of the acceleration torque after a given number of pulses of the toothed ring sensor.

5. Method according to claim 4, which comprises setting the given number of pulses as a whole number multiple of the number of teeth of a toothed starter ring of the engine multiplied by the number of strokes per working cycle and divided by twice the number of cylinders, for a reciprocating piston in-line engine.

6. Method according to claim 1, which comprises recording an angular position of the crankshaft with an optical sensor.

7. Method according to claim 1, which comprises recording an angular position of the crankshaft with a capacitive sensor.

8. Method according to claim 1, which comprises recording an angular position of the crankshaft with a mechanical sensor.

* * * * *